(12) United States Patent
Yoshinaga

(10) Patent No.: US 12,324,406 B2
(45) Date of Patent: Jun. 10, 2025

(54) ANIMAL TOILET

(71) Applicant: DAIKI CO., LTD., Tokyo (JP)

(72) Inventor: Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 30 days.

(21) Appl. No.: 18/369,932

(22) Filed: Sep. 19, 2023

(65) Prior Publication Data

US 2024/0023513 A1 Jan. 25, 2024

Related U.S. Application Data

(63) Continuation of application No. PCT/JP2022/002498, filed on Jan. 25, 2022.

(30) Foreign Application Priority Data

Apr. 20, 2021 (JP) .................................. 2021-070763

(51) Int. Cl.
*A01K 1/01* (2006.01)
(52) U.S. Cl.
CPC .................................. *A01K 1/0114* (2013.01)
(58) Field of Classification Search
CPC ..... A01K 1/0114; A01K 1/0107; A01K 1/011
See application file for complete search history.

(56) References Cited

U.S. PATENT DOCUMENTS

| 4,444,148 A | * | 4/1984 | Lander | A01K 1/0155 |
| | | | | 4/300.3 |
| 5,193,488 A | * | 3/1993 | Walton | A01K 1/0107 |
| | | | | 119/169 |
| 5,353,743 A | * | 10/1994 | Walton | A01K 23/005 |
| | | | | 119/165 |
| 7,096,823 B1 | * | 8/2006 | Smeltzer | A01K 1/0114 |
| | | | | 119/161 |
| 11,206,806 B2 | * | 12/2021 | Van Wert | A01K 1/0114 |
| 2006/0156992 A1 | * | 7/2006 | Costa | A01K 1/0107 |
| | | | | 119/161 |

FOREIGN PATENT DOCUMENTS

| CN | 1640246 A | 7/2005 |
| CN | 204409200 U | 6/2015 |
| CN | 108347902 A | 7/2018 |

(Continued)

OTHER PUBLICATIONS

Apr. 19, 2022 International Search Report issued in International Patent Application No. PCT/JP2022/002498.

(Continued)

*Primary Examiner* — Yvonne R Abbott-Lewis
(74) *Attorney, Agent, or Firm* — Oliff PLC

(57) ABSTRACT

An animal toilet includes a partition portion, an upper space, and a lower space. The partition portion has a through hole allowing urine to pass therethrough. The upper space is present above the partition portion, and is a space in which a plurality of grains are disposed. The lower space is present below the partition portion, and is a space in which the urine having passed through the through hole accumulates. The partition portion includes a wall part. The wall part is provided around the through hole on a lower surface of the partition portion, and projects toward the lower space.

19 Claims, 16 Drawing Sheets

(56) References Cited

FOREIGN PATENT DOCUMENTS

| JP | 2003-180182 A | 7/2003 |
| JP | 2014-195430 A | 10/2014 |
| JP | 2018-88881 A | 6/2018 |
| JP | 2018-171076 A | 11/2018 |
| JP | 2021-48884 A | 4/2021 |

OTHER PUBLICATIONS

Apr. 19, 2022 Written Opinion issued in International Patent Application No. PCT/JP2022/002498.
Jun. 24, 2024 Office Action issued in Chinese Patent Application No. 202280029288.8.

* cited by examiner

ANIMAL TOILET

CROSS REFERENCE TO RELATED APPLICATION

This is a Continuation of International Application No. PCT/JP2022/002498 filed Jan. 25, 2022, which claims the benefit of Japanese Application No. 2021-070763 filed Apr. 20, 2021. The contents of these applications are hereby incorporated by reference in their entirety.

TECHNICAL FIELD

The present invention relates to an animal toilet.

BACKGROUND ART

A conventional animal toilet is disclosed, for example, in Patent Document 1. The animal toilet disclosed in Patent Document 1 includes a partition portion (drainboard), an upper space, and a lower space. A through hole that allows urine to pass therethrough is formed in the partition portion. The upper space is a part of the space in a box-shaped container (tray), the part being present above the partition portion. A plurality of low water absorptive grains are disposed in the upper space. The lower space is another part of the space in the container, the part being present below the partition portion. A water-absorbing sheet that absorbs urine is disposed in the lower space.

CITATION LIST

Patent Document

Patent Document 1: JP 2003-180182 A

SUMMARY OF INVENTION

Technical Problem

In the animal toilet described above, urine excreted on the grains moves from the upper space to the lower space via the through hole of the partition portion after passing through gaps between the grains. The urine having moved to the lower space accumulates in the lower space in a state of being absorbed by the water-absorbing sheet. When a malodor is generated from the urine accumulating in the lower space, the odor tends to rise to the upper space via the through hole. This causes the malodor drifting outside the animal toilet.

Solution to Problem

The present invention has been made in view of the above-described problem, and it is an object thereof to provide an animal toilet that makes a situation less likely to occur in which an odor of urine accumulating in a lower space rises to an upper space.

An animal toilet according to the present invention includes: a partition portion that has a through hole allowing urine to pass therethrough; an upper space in which a plurality of grains are disposed, the upper space being present above the partition portion; and a lower space in which the urine having passed through the through hole accumulates, the lower space being present below the partition portion. The partition portion includes a wall part that is provided around the through hole on a lower surface of the partition portion, the wall part projecting toward the lower space.

In this animal toilet, the wall part that projects from the lower surface of the partition portion toward the lower space is provided around the through hole. Thus, even in a case where a malodor is generated from the urine accumulating in the lower space, at least a part of the odor can be dammed by the wall part. For this reason, the odor becomes less likely to flow into the thorough hole, compared to a case where the wall part is not provided.

Advantageous Effects of Invention

According to the present invention, it is possible to implement an animal toilet that makes a situation less likely to occur in which an odor of urine accumulating in a lower space rises to an upper space.

DESCRIPTION OF EMBODIMENTS

Figure 1:
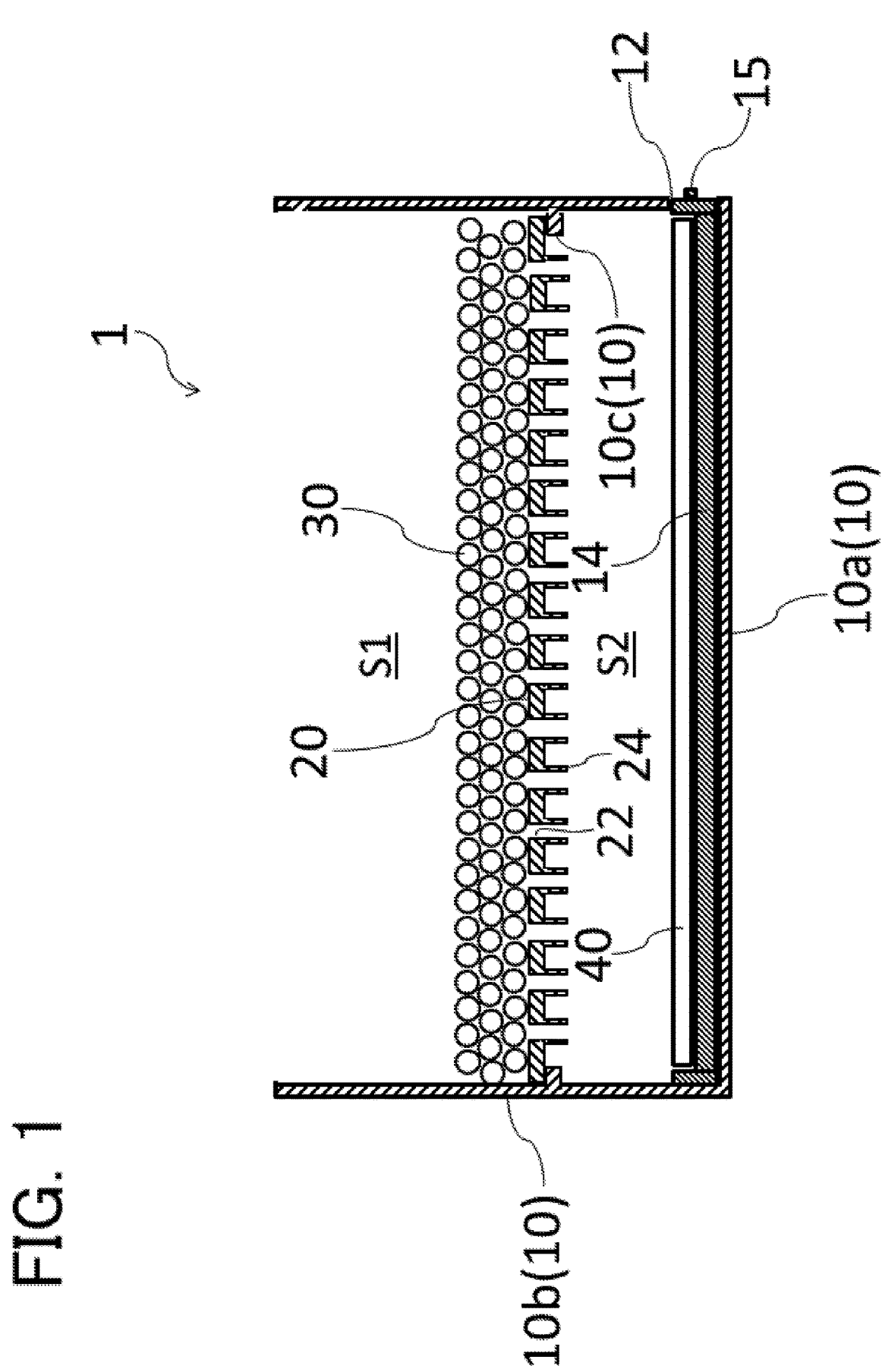
FIG. 1 is an end view showing an embodiment of an animal toilet according to the present invention.

Hereinafter, an embodiment of the present invention will be described in detail with reference to the drawings. In the description of the drawings, the same elements are given the same reference numerals, and a redundant description will be omitted.

FIG. 1 is an end view showing an embodiment of an animal toilet according to the present invention. Referring to FIG. 1, an outline of the constitution of an animal toilet 1 will be described. The animal toilet 1 includes a container 10, a drawer portion 14, a partition portion 20, a plurality of grains 30, and a water-absorbing sheet 40. The container 10 has a bottom face part 10a and a side face part 10b, and is in a box shape. In the present embodiment, the container 10 is in an approximately rectangular parallelepiped shape. As a material of the container 10, for example, plastic such as polypropylene or polyethylene can be used.

The container 10 has an overhanging part 10c that is provided so as to overhang from the side face part 10b toward the inside of the container 10. The overhanging part 10c may be a projection or a projected rim. The overhanging part 10c may be formed integrally with the side face part 10b, or may be attached to the side face part 10b after being formed separately from the side face part 10b. The overhang length of the overhanging part 10c (the length in the direction perpendicular to the inner surface of the side face part 10b provided with the overhanging part 10c) is, for example, between 5 mm and 15 mm inclusive.

The drawer portion 14 is capable of being inserted in and extracted from the container 10 through an opening 12 formed in the side face part 10b. The drawer portion 14 houses the water-absorbing sheet 40. As a material of the drawer portion 14, for example, plastic such as polypropylene or polyethylene can be used.

The partition portion 20 is placed on the overhanging part 10c. The partition portion 20 is not fixed to the container 10. The partition portion 20 is detachable relative to the container 10. The partition portion 20 is in an approximately plate shape, and arranged in parallel with the bottom face part 10a. The partition portion 20 has a through hole 22 that allows urine to pass through the through hole 22. The partition portion 20 is provided at a position apart from both the water-absorbing sheet 40 and the upper end of the container 10. Thus, the partition portion 20 divides the inside of the container 10 vertically. That is, the partition portion 20 is disposed so as to divide the internal space of the container 10 into an upper space S1 and a lower space S2. The upper space S1 is present above the partition portion 20, and is a space in which the plurality of grains 30 are disposed. The lower space S2 is present below the partition portion 20, and is a space in which urine that has passed through the through hole 22 accumulates. In this way, the animal toilet 1 includes the upper space S1 and the lower space S2 that are separated by the partition portion 20. As a material of the partition portion 20, for example, plastic such as polypropylene or polyethylene can be used.

The plurality of grains 30 for treating excrement (urine) are disposed in the upper space S1. The plurality of grains 30 are disposed in the upper space S1 in a state of being laid on the partition portion 20. When the animal toilet 1 is used, the grains 30 directly receive excreted urine. The grains 30 have a water-repellent property. That is, the grains 30 have the property of not absorbing liquid such as urine at all, or hardly absorbing it.

The grains 30 having the water-repellent property require the water-repellent rate of 80% or more measured by the following test. First, approximate 50 grams of the grains 30 (sample) are placed in a sieve with the inner diameter of 10 cm and the mesh size of 1 mm. An empty beaker is set under the sieve. Then, 30 ml of water is dripped on the sample over 10 seconds using a syringe with the inner diameter of its outer cylinder of 3 cm and the inner diameter of its cylinder tip of 4 mm (60 ml syringe manufactured by Terumo Corp.). After waiting 1 minute, the quantity of the water in the beaker is measured. The ratio of the measured water quantity with respect to the quantity of the dripped water (30 ml) shall be the water-repellent rate. That is, if the water quantity in the beaker is 24 ml or more, the water-repellent rate is 80% or more, and therefore the grains 30 are found to have the water-repellent property. For reference, the water-repellent rate of general water-absorbing cat litter, which is commercially available, is about 5%.

The grains 30 are each formed in a granular shape. Examples of the granular shape include a sphere, column, and ellipsoid. The particle diameter of the grain 30 is, for example, between 5 mm and 20 mm inclusive. As used herein, the particle diameter is defined as the diameter of the minimum sphere that can include the grain 30. The grain 30 preferably contains an organic substance as its main material. As used herein, the main material refers to the material that accounts for the highest weight ratio in the grain 30, out of one or more materials constituting the grain 30. As the organic substance, for example, papers, used tea leaves, plastics, or bean curd lees can be used.

The papers refer to a material composed mainly of pulp. Examples of the papers include, in addition to ordinary paper, a vinyl chloride wallpaper classified product, photographic paper, release paper, fluff pulp, papermaking sludge, and pulp sludge. The vinyl chloride wallpaper classified product is obtained by removing part of polyvinyl chloride from vinyl chloride wallpaper containing paper and polyvinyl chloride. Examples of the plastics include, in addition to ordinary plastic, an aluminum deposited film, and a disposable diaper classified product (plastic obtained by classifying disposable diapers). The bean curd lees are preferably dried bean curd lees. These materials may be subjected to water repellency treatment.

The material(s) constituting the grain 30 may be only one material, or two or more materials. In the former case, the main material described above is the only material constituting the grain 30. In the latter case, the grain 30 is made of a mixture of the main material and other material(s). Gypsum is an example of the other material. Adding gypsum can enhance the water-repellent property of the grain 30. The quantity of gypsum is, for example, between 5 wt. % and 15 wt. % inclusive with respect to the entirety of the grain 30.

The grains 30 can be manufactured by, for example, the following method. First, granules that will serve as the grains 30 are formed by granulating a granulating material (the material(s) constituting the grains 30) with a granulation apparatus. As the granulation apparatus, for example, an extrusion granulator can be used. The granules may be subjected to water repellency treatment as needed. The water repellency treatment can be performed by, for example, coating the surfaces of the granules with a water repellent agent. In the case where the water repellency treatment is not performed, it is preferable that crevices are prevented from forming in the granules as much as possible by increasing the pressure that is applied to the granulating material during granulation. This is because the crevices serve as a path through which moisture such as urine enters inside the grains 30. Prior to the granulation, pretreatment such as pulverization, kneading, and adding water is performed on the granulating material as needed. Also, after the granulation, posttreatment such as sieving (sizing), and drying is performed as needed.

The water-absorbing sheet 40 is disposed in the lower space S2. In the present embodiment, the water-absorbing sheet 40 is disposed in the lower space S2 in a state of being housed in the drawer portion 14. The water-absorbing sheet 40 absorbs urine that has passed through the through hole 22 of the partition portion 20. That is, the urine having passed through the through hole 22 accumulates in the lower space S2 in a state of being absorbed by the water-absorbing sheet 40.

When the animal toilet 1 is used, urine excreted on the grains 30 flows downward, passing through gaps between the grains 30. The urine moves from the upper space S1 to the lower space S2 via the through hole 22 of the partition portion 20, and then is absorbed by the water-absorbing sheet 40.

Figure 2:
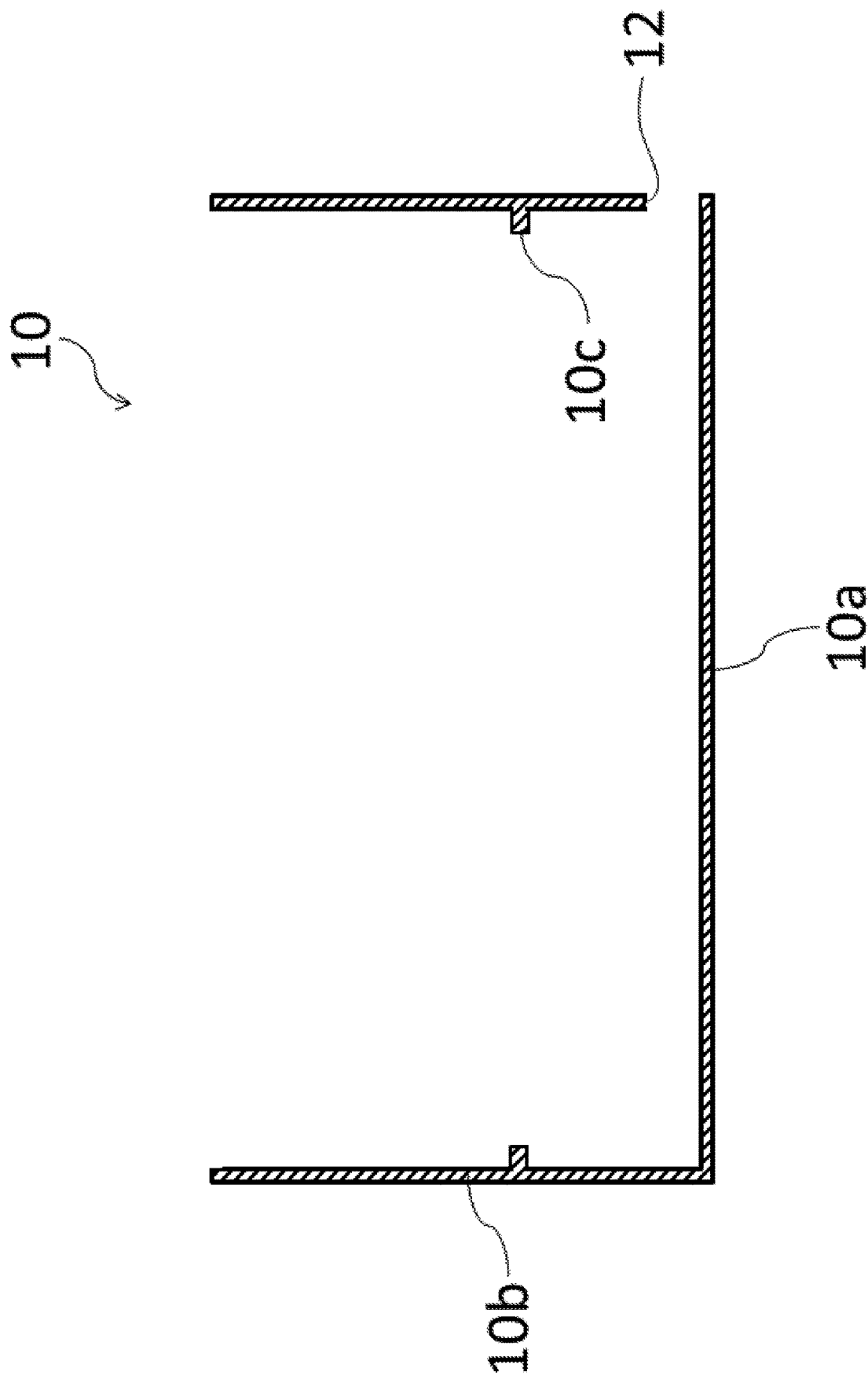
FIG. 2 is an end view showing a container 10.
Figure 3:
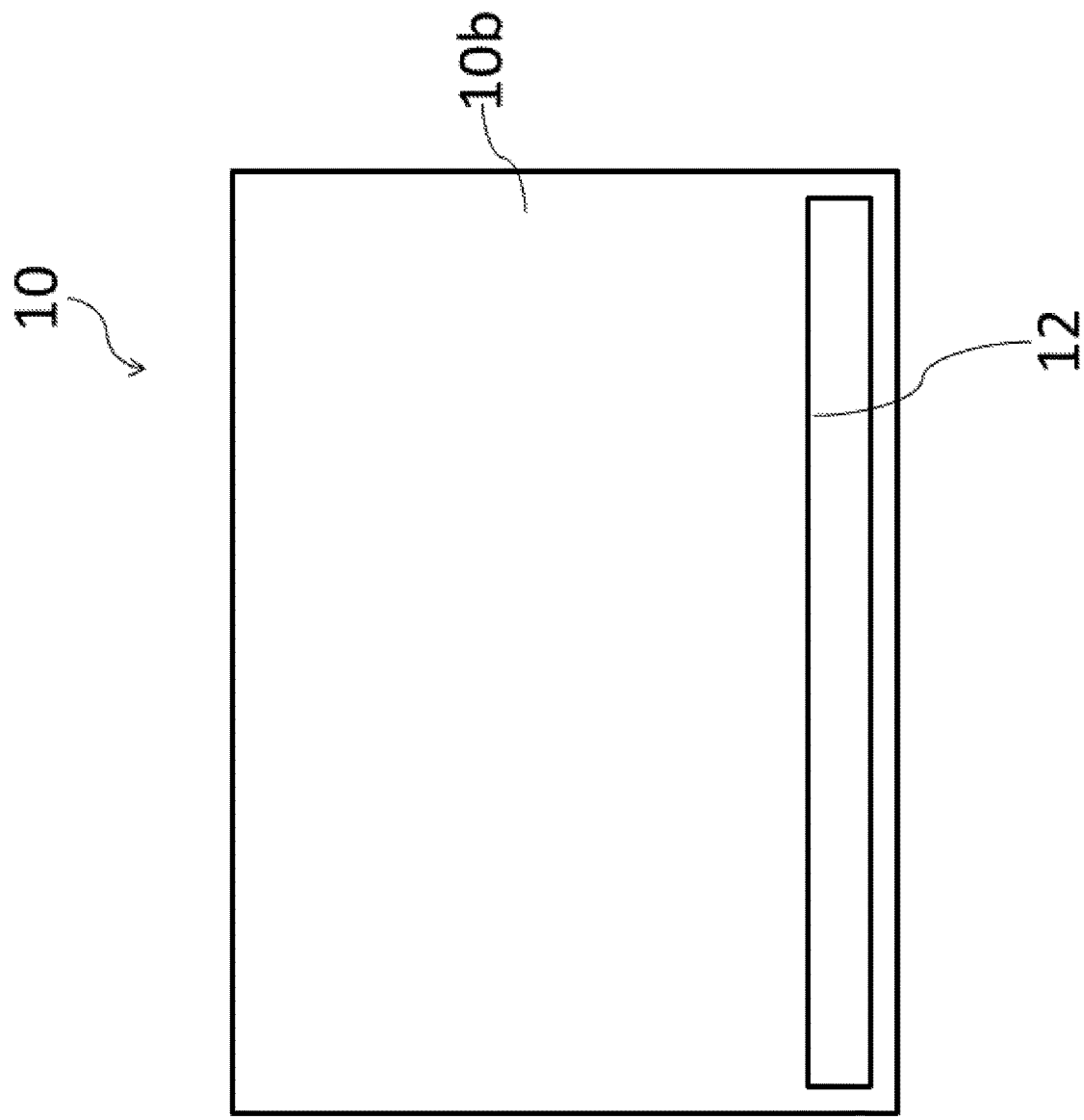
FIG. 3 is a front view showing the container 10.
Figure 4:
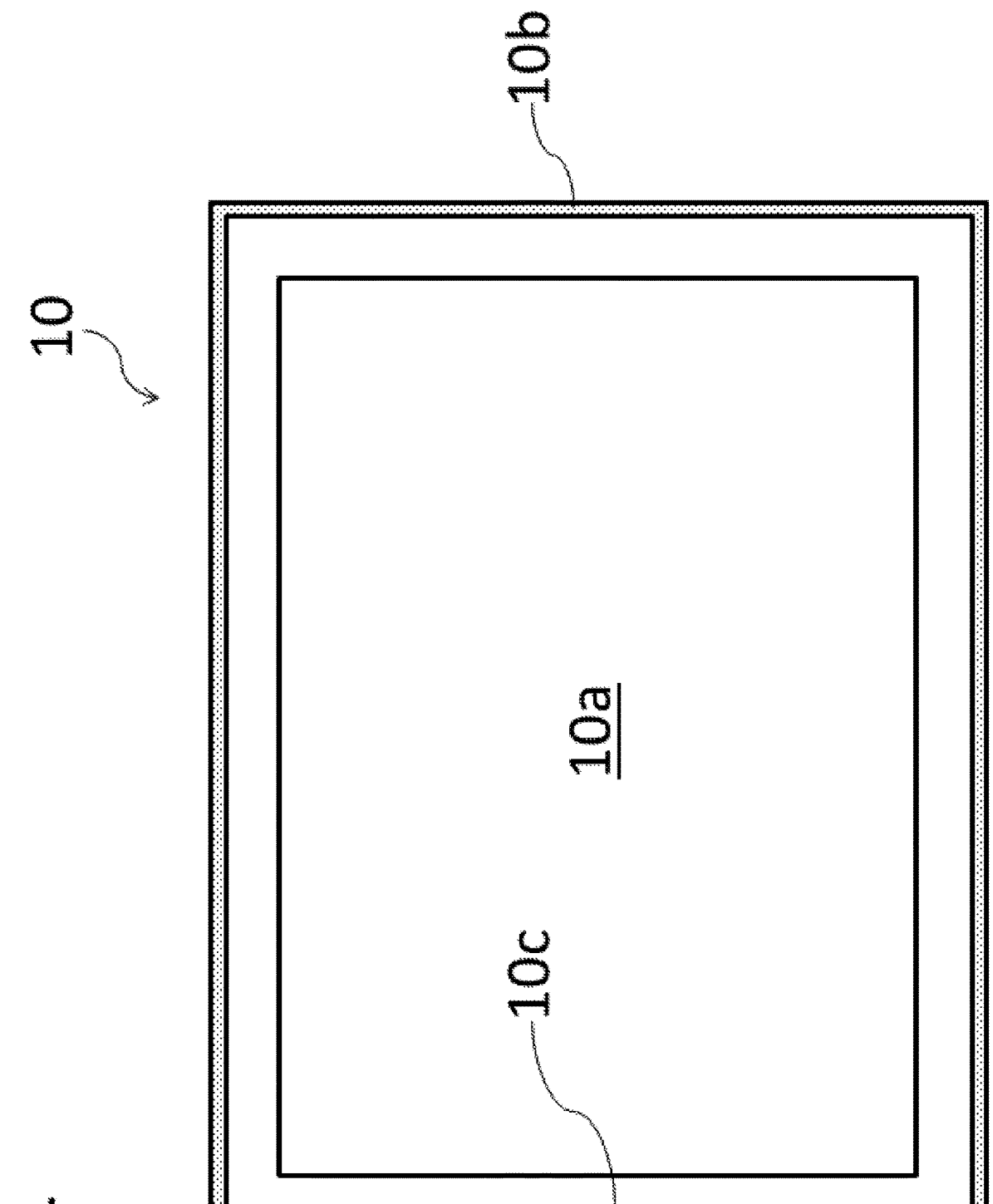
FIG. 4 is a plane view showing the container 10.

Hereinafter, referring to FIG. 2 to FIG. 9, the constitution of each portion of the animal toilet 1 will be described in detail. FIG. 2, FIG. 3 and FIG. 4 are, respectively, an end view, a front view and a plane view showing the container 10. As shown in FIG. 2 and FIG. 3, the opening 12 for inserting and extracting the drawer portion 14 is formed in the side face part 10b of the container 10. The opening 12 is located near the bottom face part 10a, and in a horizontally long rectangular shape. The length in the horizontal direction (right/left direction in FIG. 3) of the opening 12 is nearly equal to the breadth of the inside of the container 10, and is, for example, between 20 cm and 40 cm inclusive. The length in the vertical direction (top/bottom direction in FIG. 3) of the opening 12 is, for example, between 2 cm and 5 cm inclusive. Also, as shown in FIG. 4, the overhanging part 10c is composed of a projected rim that is provided annularly over the entirety of the inner surface of the side face part 10b in a plane view in the present embodiment.

Figure 5:
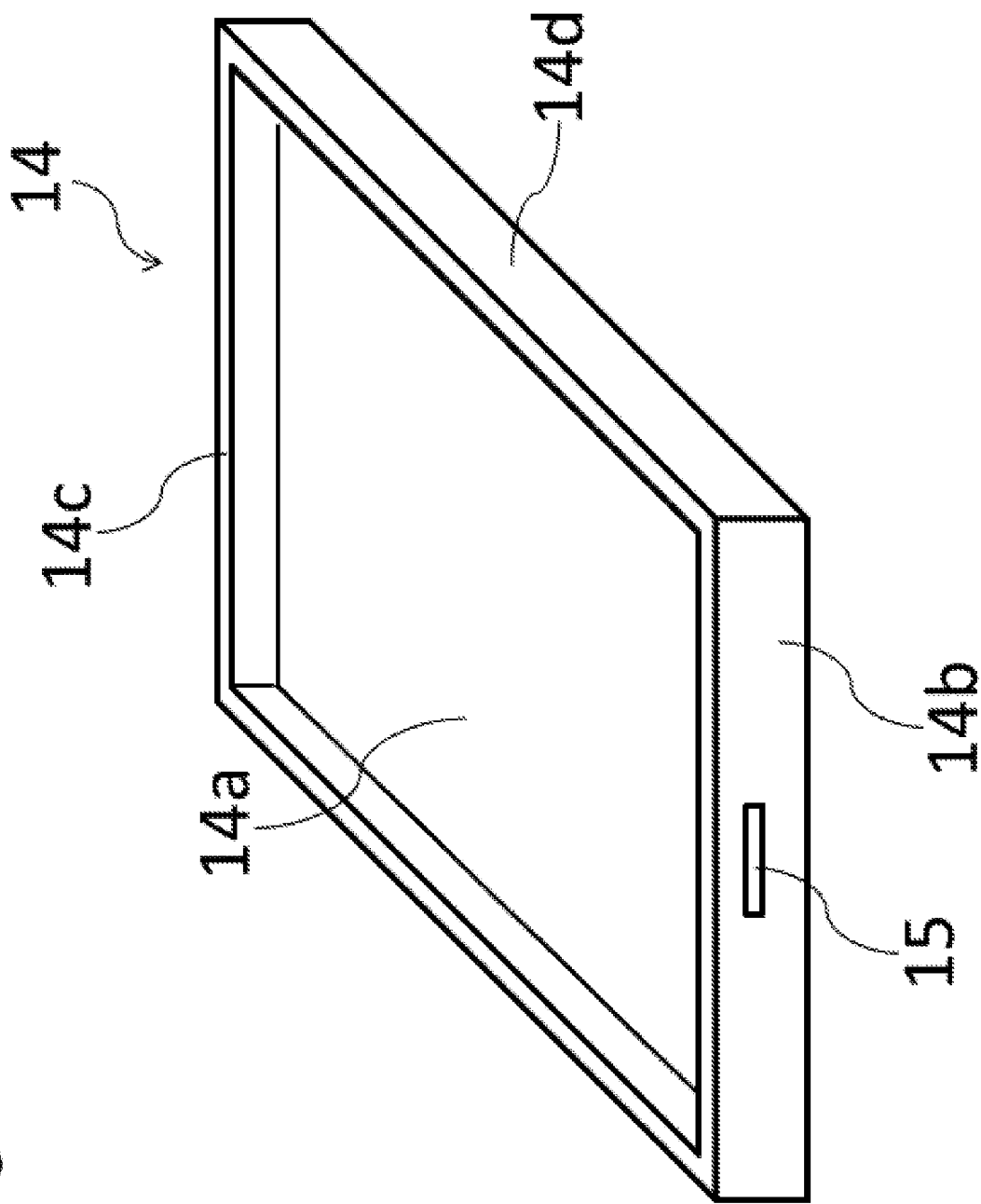
FIG. 5 is a perspective view showing a drawer portion 14.

FIG. 5 is a perspective view showing the drawer portion 14. The drawer portion 14 has a bottom board 14a, a front board 14b, a rear board 14c, and a pair of side boards 14d. The size of the bottom board 14a is nearly equal to the size of the bottom face part 10a of the container 10. The front board 14b has nearly the same shape and size as the opening 12. A grip 15 is attached to the front board 14b.

Figure 6:
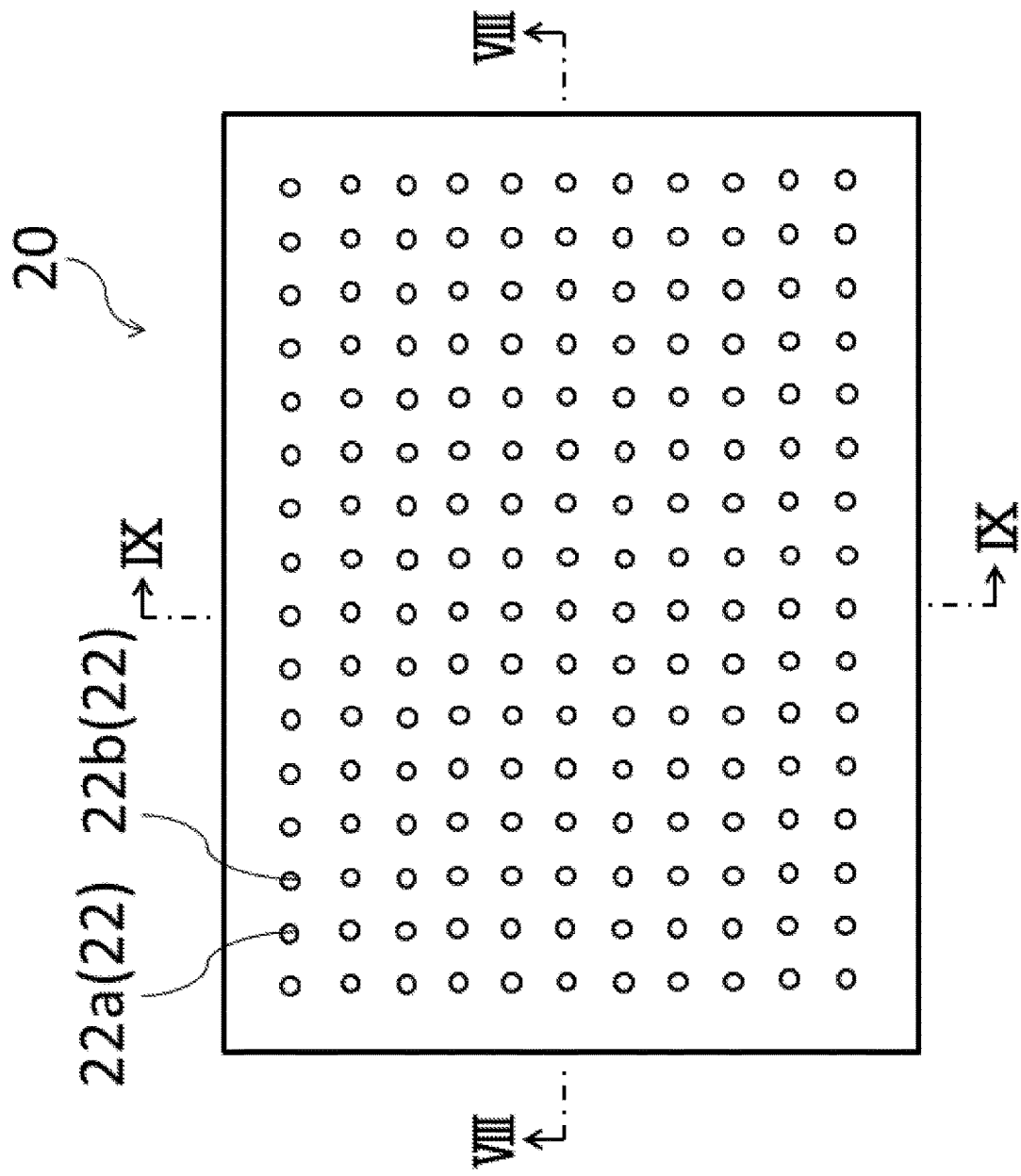
FIG. 6 is a plane view showing a partition portion 20.
Figure 7:
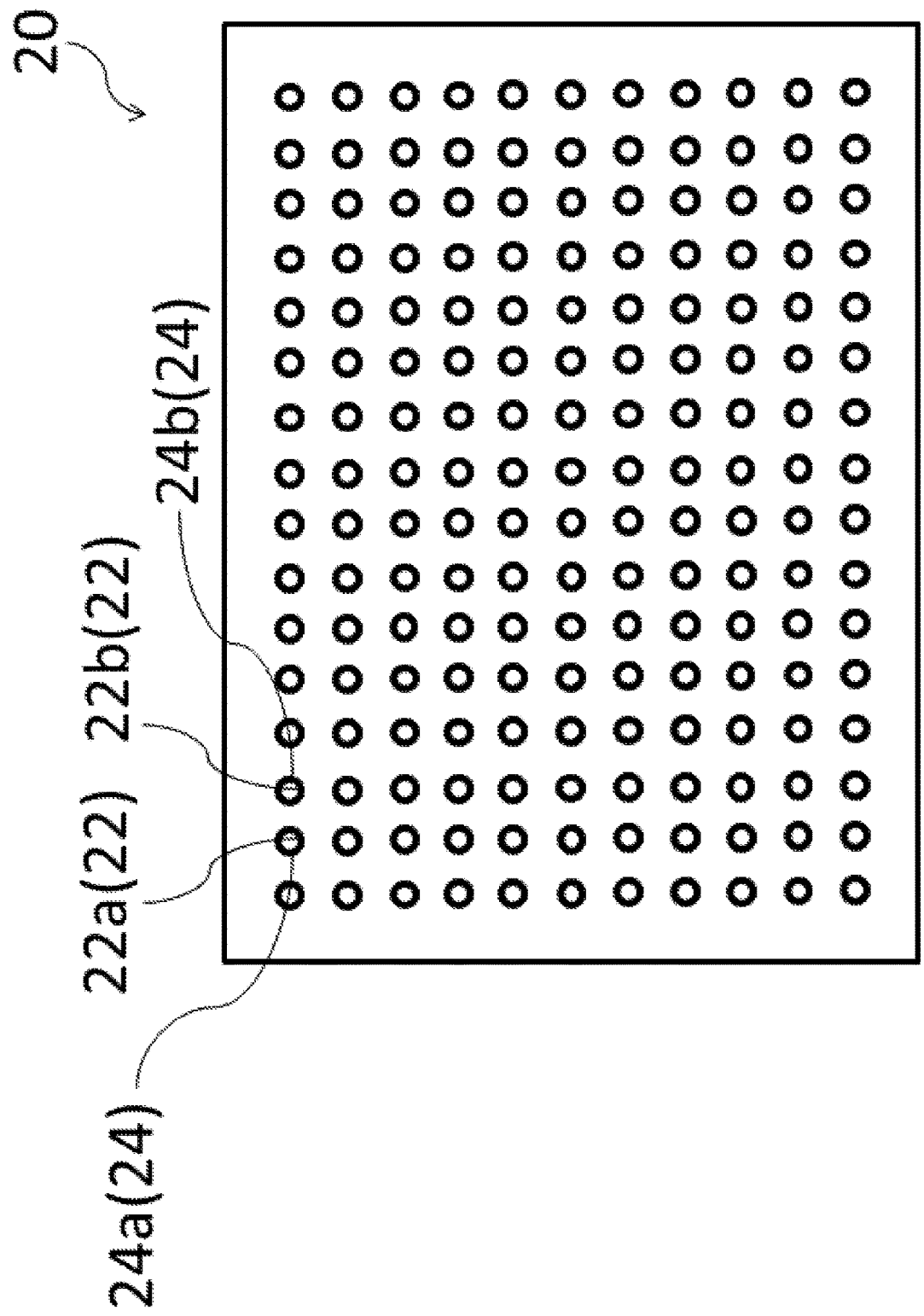
FIG. 7 is a bottom view showing the partition portion 20.
Figure 8:
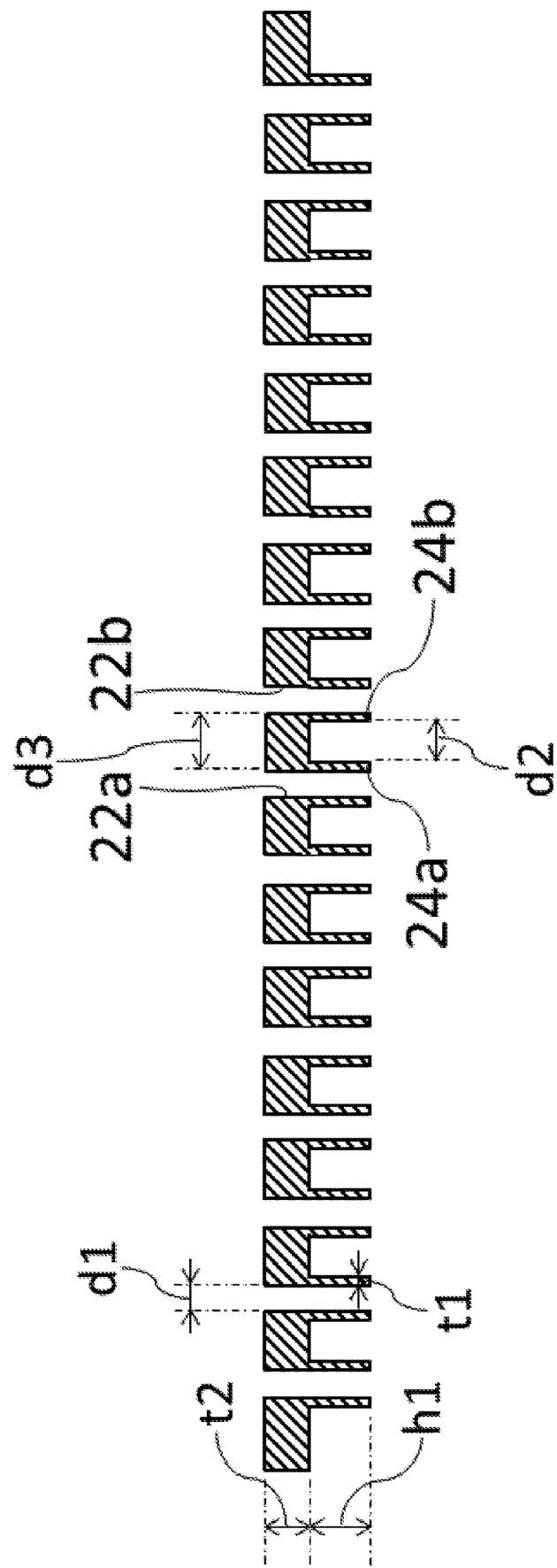
FIG. 8 is an end view taken along line VIII-VIII in FIG. 6.
Figure 9:
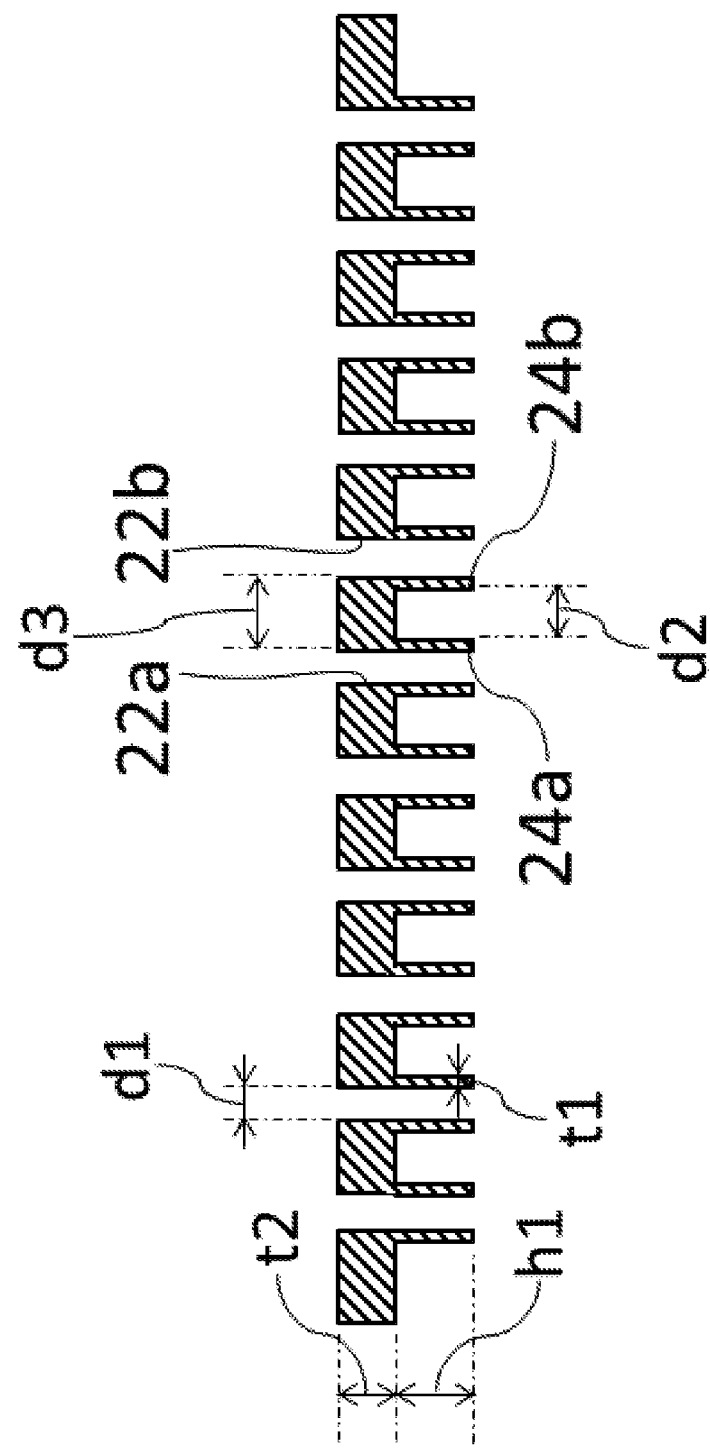
FIG. 9 is an end view taken along line IX-IX in FIG. 6.

FIG. 6 and FIG. 7 are, respectively, a plane view and a bottom view showing the partition portion 20. That is, FIG. 6 and FIG. 7 show the upper surface (surface on the upper space S1 side) and the lower surface (surface on the lower space S2 side) of the partition portion 20, respectively. Also, FIG. 8 and FIG. 9 are end views taken along line VIII-VIII and line IX-IX in FIG. 6, respectively. The partition portion 20 is in an approximately rectangular shape in a plane view (see FIG. 6). As used herein, "approximately rectangular shape" means that the shape includes not only a rectangle but also a shape similar to a rectangle such as a round corner rectangle.

The partition portion 20 has a plurality of the through holes 22. In the descriptions below, "plurality of through holes 22" refers to all of the through holes 22 provided in the partition portion 20 unless otherwise indicated. The plurality of through holes 22 are arranged two-dimensionally in the partition portion 20. In detail, the plurality of through holes 22 are arranged two-dimensionally along a first direction (right/left direction in FIG. 6), and a second direction (top/bottom direction in FIG. 6) that intersects with the first direction. In the present embodiment, the second direction is the direction orthogonal to the first direction. That is, the plurality of through holes 22 are arranged in a square lattice pattern. The plane shape of each through hole 22 is a circle. Each through hole 2 allows urine to pass therethrough, but does not allow the grain 30 to pass therethrough.

The partition portion 20 includes a wall part 24. The wall part 24 is provided around the through hole 22 on the lower surface of the partition portion 20, and projects toward the lower space S2. The wall part 24 is in a pipe shape, and surrounds the whole periphery of the through hole 22. In the present embodiment, the wall part 24 is in a cylindrical shape. Therefore, the wall part 24 extends vertically downward from the lower surface of the partition portion 20. The inner surface of the wall part 24 is continuous with the side surface of the through hole 22. For this reason, the inner diameter (diameter in the horizontal direction) of the wall part 24 is equal to the diameter d1 of the through hole 22. The lower end of the wall part 24 is located below the upper surface of the overhanging part 10c of the container 10. The thickness t1 of the wall part 24 is preferably a quarter or less, and more preferably an eighth or less of the diameter d1 of the through hole 22. The height h1 of the wall part 24 is preferably larger than the thickness t2 of the partition portion 20. The thickness t2 is equal to the length of the through hole 22.

The wall part 24 is provided around each through hole 22. Therefore, a plurality of the wall parts 24 are also provided due to the plurality of through holes 22 being provided. The number of the wall parts 24 is equal to the number of the through holes 22. The plurality of through holes 22 includes a through hole 22a (first through hole), and a through hole 22b (second through hole). The through hole 22a is an arbitrary through hole 22 out of the plurality of through holes 22. The through hole 22b is the through hole 22 that is nearest to the through hole 22a out of the plurality of through holes 22. The wall part 24 includes a wall part 24a (first wall part) that is provided around the through hole 22a, and a wall part 24b (second wall part) that is provided around the through hole 22b. The distance d2 between the wall part 24a and the wall part 24b is larger than the thickness t1 of the wall part 24a and the wall part 24b. The distance d2 is preferably half or more, and more preferably two-thirds or more of the distance d3 between the through hole 22a and the through hole 22b.

Figure 10:
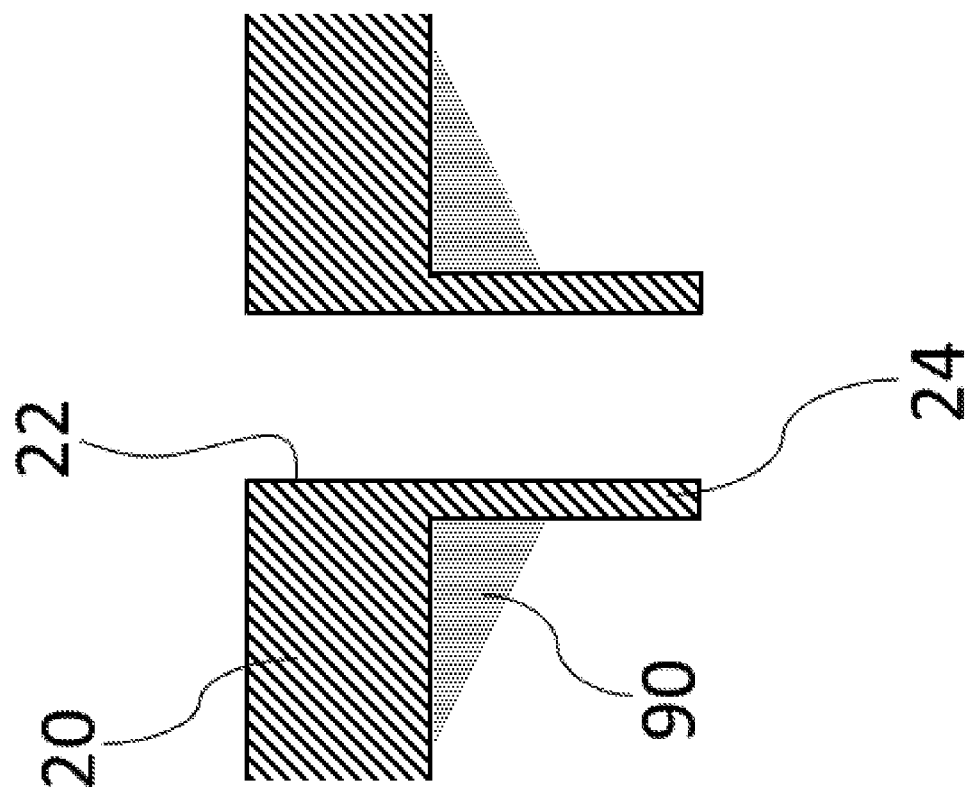
FIG. 10 is an end view for illustrating an effect of the animal toilet in FIG. 1.

The effects of the animal toilet 1 will be described. In the animal toilet 1, the wall part 24 that projects from the lower surface of the partition portion 20 toward the lower space S2 is provided around the through hole 22. Thus, even in a case where a malodor is generated from the urine accumulating in the lower space S2, at least a part of the odor 90 can be dammed by the wall part 24 as shown in FIG. 10. For this reason, the odor 90 becomes less likely to flow into the thorough hole 22, compared to a case where the wall part 24 is not provided. Accordingly, the animal toilet 1 is implemented that makes a situation less likely to occur in which the odor 90 of urine accumulating in the lower space S2 rises to the upper space S1.

The inner surface of the wall part 24 is continuous with the side surface of the through hole 22. In this case, the odor is prevented from flowing into the thorough hole 22 more easily than in a case where the inner surface of the wall part 24 is not continuous with the side surface of the through hole 22, namely in a case where the wall part 24 is apart from the through hole 22.

The wall part 24 is in a pipe shape, and surrounds the whole periphery of the through hole 22. In this case, the odor is prevented from flowing into the thorough hole 22 more surely than in a case where the wall part 24 is provided at only a part of the periphery of the through hole 22.

The wall part 24 is in a cylindrical shape. In this case, the wall part 24 that surrounds the whole periphery of the through hole 22 can be implemented with simple constitution.

Figure 11:
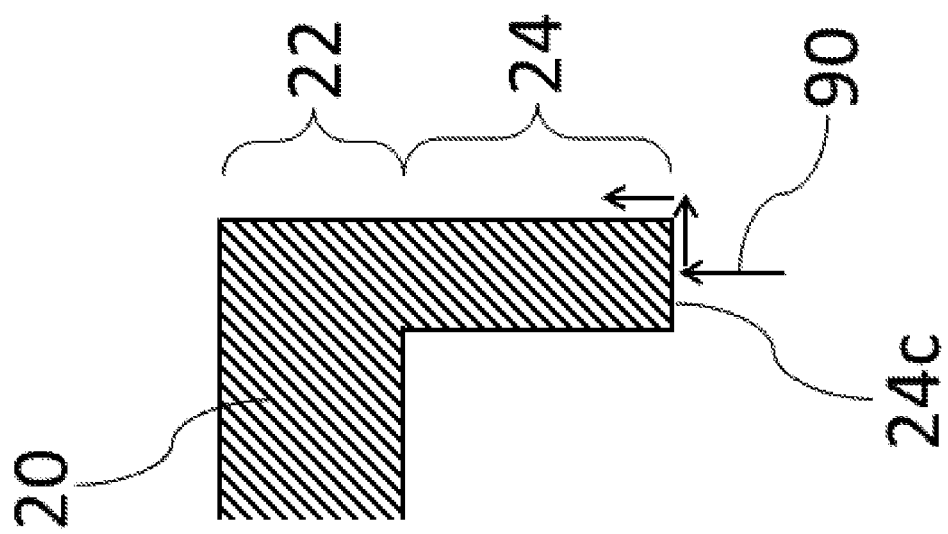
FIG. 11 is an end view for illustrating an effect of the animal toilet in FIG. 1.

Incidentally, as shown by the arrow in FIG. 11, the odor 90 that has reached the lower end 24c of the wall part 24 may flow into the through hole 22 along the lower end 24c. Therefore, reducing the thickness of the wall part 24 is advantageous for making the odor 90 less likely to flow into the through hole 22, because the area of the lower end 24c becomes smaller. From this viewpoint, the thickness of the wall part 24 is preferably a quarter or less, and more preferably an eighth or less of the diameter of the through hole 22. On the other hand, if the thickness of the wall part 24 is too small, the strength of the wall part 24 is likely to be insufficient. From this viewpoint, the thickness of the wall part 24 is preferably a sixteenth or more of the diameter of the through hole 22.

Enlarging the height of the wall part 24 is advantageous for damming a large amount of odor with the wall part 24.

From this viewpoint, the height of the wall part 24 is preferably larger than the thickness of the partition portion 20. On the other hand, if the height of the wall part 24 is too large, it may cause hindrance that the pipe-shaped wall part 24 becomes likely to be clogged with urine, for example. From this viewpoint, the height of the wall part 24 is preferably three times or less of the thickness of the partition portion 20.

The partition portion 20 has the plurality of through holes 22. By providing the plurality of through holes 22 in this way, urine can move smoothly from the upper space S1 to the lower space S2. Also, the wall part 24 is provided around each through hole 22. Thus, it is possible to make an odor less likely to flow into any through holes 22.

The distance d2 (see FIG. 8 and FIG. 9) between the wall part 24a and the wall part 24b is larger than the thickness of each wall part 24a, 24b. By enlarging the distance d2 in this way, a wide space for catching an odor can be ensured. This is advantageous for damming a large amount of odor with the wall part 24. From this viewpoint, the distance d2 is preferably half or more, and more preferably two-thirds or more of the distance d3 between the through hole 22a and the through hole 22b. On the other hand, if the distance d2 is too large, the thickness of the wall part 24 may become excessively small. From this viewpoint, the distance d2 is preferably seven-eighths or less of the distance d3.

Each grain 30 has a water-repellent property. In this case, most of urine excreted on the grains 30 is not absorbed by the grains 30, and passes through gaps between the grains 30. Thus, the urine can be smoothly guided to the partition portion 20.

In the case where each grain 30 contains an organic substance as its main material, it is possible to obtain the grains 30 suitable for being disposed of by incineration. If the grains 30 are suitable for being disposed of by incineration in this way, the grains 30 after use can be disposed of as burnable garbage, which therefore increases convenience for users.

The animal toilet 1 is provided with the container 10 that includes the internal space divided into the upper space S1 and the lower space S2 by the partition portion 20. In this case, it is possible to implement the animal toilet 1 including the upper space S1 and the lower space S2 with one container (the container 10). This is advantageous for simplifying the constitution of the animal toilet 1.

The partition portion 20 is not fixed to the container 10. In this case, the partition portion 20 can be attached to and detached from the container 10 easily.

The partition portion 20 is placed on the overhanging part 10c. Thus, the partition portion 20 can stay at a predetermined position in the container 10 without being fixed to the container 10.

The water-absorbing sheet 40 is disposed in the lower space S2. Thus, urine accumulating in the lower space S2 can be confined in the water-absorbing sheet 40. For this reason, it is possible to ease generation of malodors caused by the urine.

The animal toilet 1 is provided with the drawer portion 14 that is capable of being inserted in and extracted from the container 10. Thus, it is possible to easily carry out the work of replacing a used water-absorbing sheet 40 with a new one.

Figure 12:
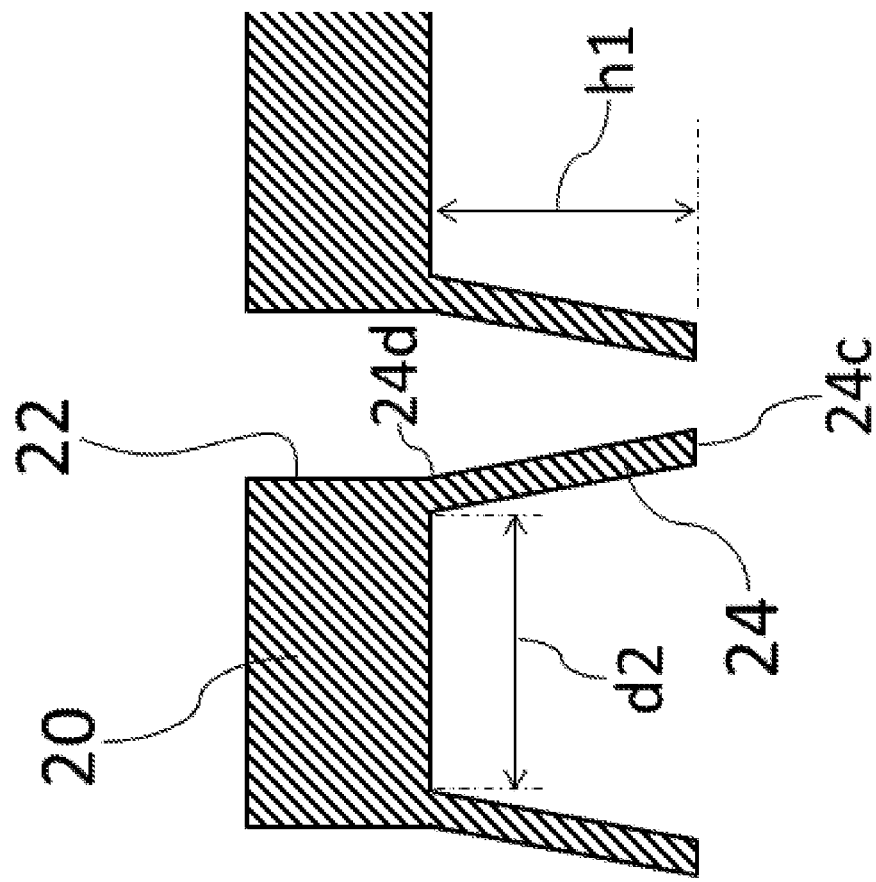
FIG. 12 is an end view for illustrating a modified example of a wall part 24.
Figure 13:
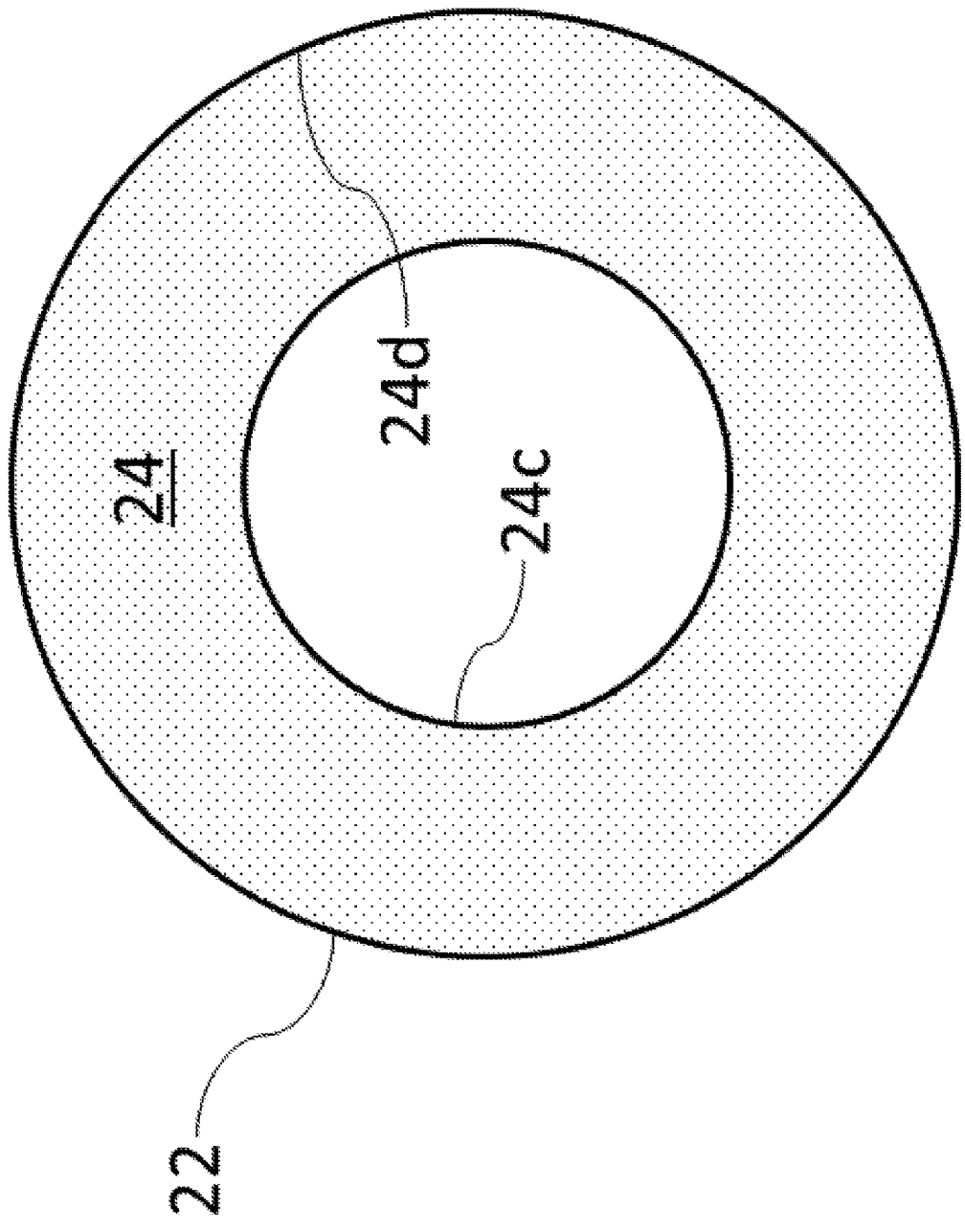
FIG. 13 is a plane view showing a through hole 22 and the wall part 24 in FIG. 12.

The present invention is not limited to the above-described embodiment, and various modifications can be made. In the above-described embodiment, an example is given in which the wall part 24 extends vertically downward from the lower surface of the partition portion 20. However, the wall part 24 may extend obliquely so as to go inside the through hole 22 as going away from the lower surface of the partition portion 20 as shown, for example, in FIG. 12. Also in this example, the wall part 24 is provided so as to surround the whole periphery of the through hole 22. The opening area of the lower end 24c of the wall part 24 is smaller than the opening area of the upper end 24d of the wall part 24. The inner diameter of the wall part 24 decreases gradually from the upper end 24d toward the lower end 24c. That is, the wall part 24 has a taper shape. The lower end 24c of the wall part 24 is present in the through hole 22 in a plane view as shown in FIG. 13. FIG. 13 is a plane view in which the through hole 22 and the wall part 24 in FIG. 12 are seen from above.

By making the wall part 24 oblique in this way, an odor can be prevented from flowing into the through hole 22 much more easily. Note that in the case where the wall part 24 is provided obliquely, the height h1 of the wall part 24 is defined as the vertical distance from the lower end 24c to the upper end 24d. Also, the distance d2 between the wall part 24a and the wall part 24b is defined as the distance between the upper ends thereof.

Figure 14:
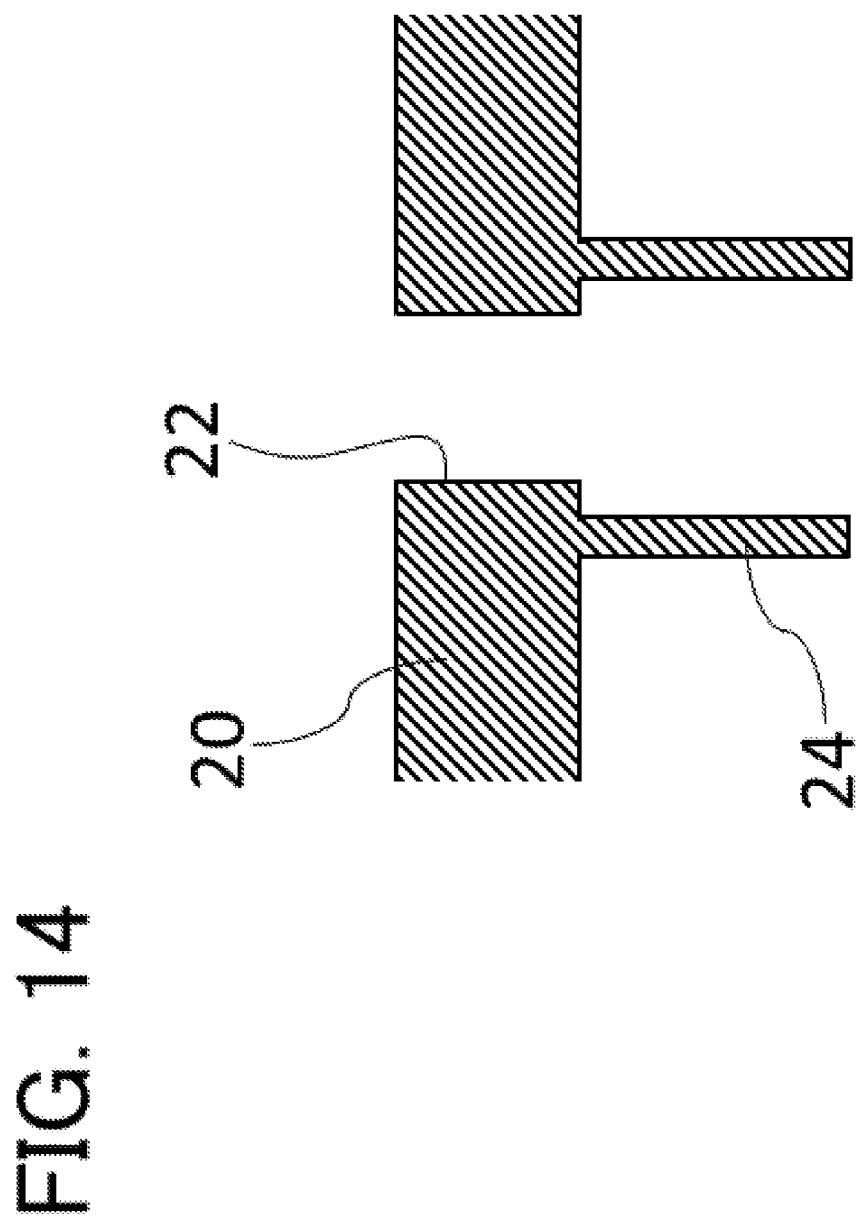
FIG. 14 is an end view for illustrating another modified example of the wall part 24.

In the above-described embodiment, an example is given in which the inner surface of the wall part 24 is continuous with the side surface of the through hole 22. However, the inner surface of the wall part 24 may not be continuous with the side surface of the through hole 22 as shown, for example, in FIG. 14.

Figure 15:
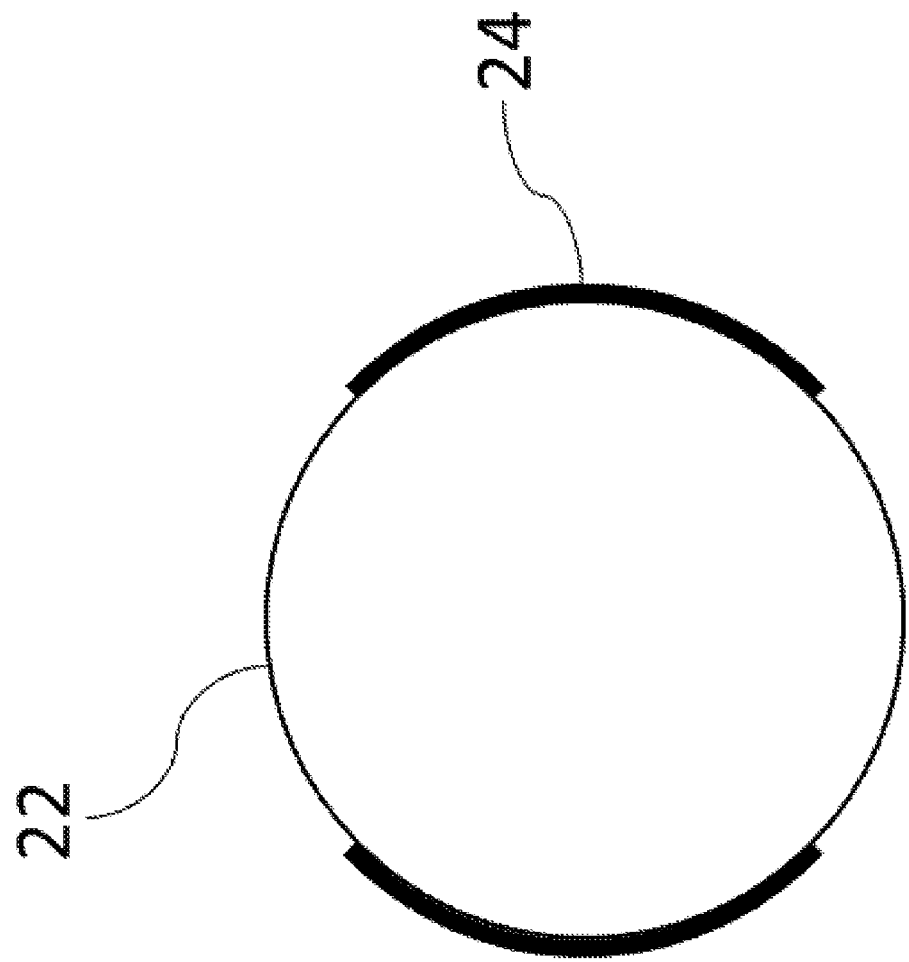
FIG. 15 is a bottom view for illustrating another modified example of the wall part 24.

In the above-described embodiment, an example is given in which the wall part 24 is provided so as to surround the whole periphery of the through hole 22. However, the wall part 24 may be provided at only a part of the periphery of the through hole 22 as shown, for example, in FIG. 15. FIG. 15 is a bottom view in which the through hole 22 and the wall part 24 are seen from below.

In the above-described embodiment, an example is given in which the plane shape of the through hole 22 is a circle. However, the plane shape of the through hole 22 is arbitrary, and may be, for example, a polygon such as a rectangle, or an ellipse.

In the above-described embodiment, an example is given in which the drawer portion 14 is provided. However, it is not essential to provide the drawer portion 14. In the case where the drawer portion 14 is not provided, the water-absorbing sheet 40 is disposed directly on the bottom face part 10a. In that case, the side face part 10b is not provided with the opening 12 naturally.

In the above-described embodiment, an example is given in which the water-absorbing sheet 40 is disposed in the lower space S2. However, it is not essential to dispose the water-absorbing sheet 40 in the lower space S2. In the case where the water-absorbing sheet 40 is not disposed, the drawer portion 14 is also not provided.

Figure 16:
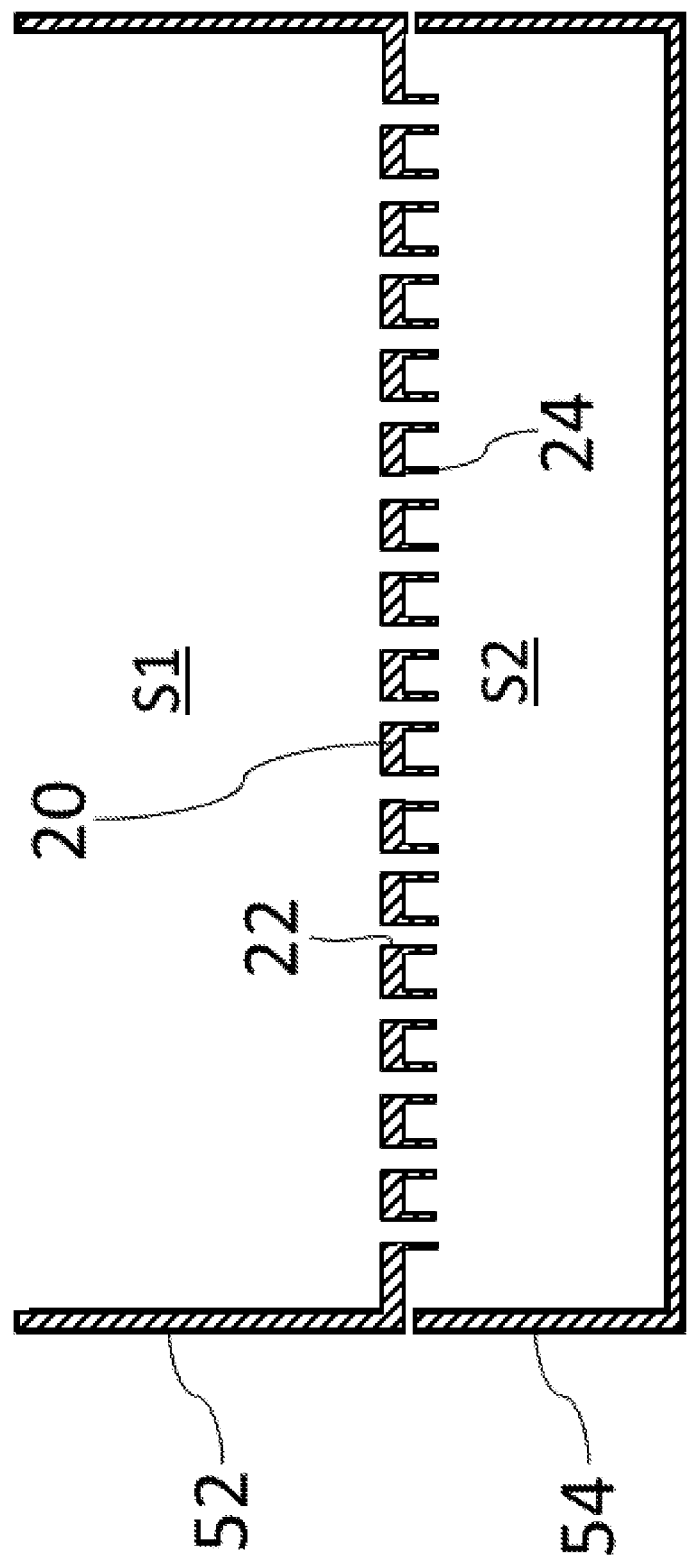
FIG. 16 is an end view for illustrating a modified example of the animal toilet in FIG. 1.

In the above-described embodiment, an example is given in which the upper space S1 and the lower space S2 are constituted by one container 10. However, a container 52 constituting the upper space S1 and a container 54 constituting the lower space S2 may be provided separately as shown, for example, in FIG. 16. In FIG. 16, the container 52 and the container 54 each have a bottom face part and a side face part, and are in a box shape. The container 52 is put on the container 54. Moreover, the bottom face part of the container 52 is the partition portion 20.

LIST OF REFERENCE NUMERALS

1 Animal Toilet
10 Container

10a Bottom Face Part
10b Side Face Part
10c Overhanging Part
12 Opening
14 Drawer Portion
15 Grip
20 Partition Portion
22 Through Hole
22a Through Hole (First Through Hole)
22b Through Hole (Second Through Hole)
24 Wall Part
24a Wall Part (First Wall Part)
24b Wall Part (Second Wall Part)
24c Lower End
24d Upper End
30 Grain
40 Water-Absorbing Sheet
52 Container
54 Container
S1 Upper Space
S2 Lower Space
90 Odor

The invention claimed is:

1. An animal toilet comprising:
a partition portion that has a through hole allowing urine to pass therethrough;
an upper space in which a plurality of grains are disposed, the upper space being above the partition portion; and
a lower space in which the urine having passed through the through hole accumulates, the lower space being below the partition portion, wherein
the partition portion includes a wall part that is around the through hole on a lower surface of the partition portion, the wall part projecting toward the lower space, and
the wall part is pipe shaped, and surrounds a whole periphery of the through hole.

2. The animal toilet according to claim 1,
wherein an inner surface of the wall part is continuous with a side surface of the through hole.

3. The animal toilet according to claim 1,
wherein the wall part is cylindrical.

4. The animal toilet according to claim 1,
wherein a thickness of the wall part is a quarter or less of a diameter of the through hole.

5. The animal toilet according to claim 1,
wherein a height of the wall part is larger than a thickness of the partition portion.

6. The animal toilet according to claim 1,
wherein the partition portion has a plurality of the through holes, and
the wall part is around each of the through holes.

7. The animal toilet according to claim 6,
wherein the plurality of through holes include a first through hole, and a second through hole nearest to the first through hole, and
the wall part includes a first wall part around the first through hole, and a second wall part around the second through hole.

8. The animal toilet according to claim 7,
wherein a distance between the first wall part and the second wall part is larger than a thickness of the first and second wall parts.

9. The animal toilet according to claim 7,
wherein a distance between the first wall part and the second wall part is half or more of a distance between the first through hole and the second through hole.

10. The animal toilet according to claim 1,
wherein each of the grains has a water-repellent property.

11. The animal toilet according to claim 1, further comprising:
a box-shaped container that has a bottom face part and a side face part,
wherein the partition portion divides an internal space of the container into the upper space and the lower space.

12. The animal toilet according to claim 11, further comprising:
a water-absorbing sheet that is disposed in the lower space, and absorbs the urine having passed through the through hole.

13. The animal toilet according to claim 12, further comprising:
a drawer portion that houses the water-absorbing sheet,
wherein an opening is formed in the side face part of the container, and
the drawer portion is capable of being inserted in and extracted from the container through the opening.

14. An animal toilet comprising:
a partitiona portion that has a through hole allowing urine to pass therethrough;
an upper space in which a plurality of grains are disposed, the upper space being above the partition portion; and
a lower space in which the urine having passed through the through hole accumulates, the lower space being below the partition portion, wherein
the partition portion includes a wall part that is around the through hole on a lower surface of the partition portion, the wall part projecting toward the lower space, and
the wall part extends obliquely so as to go inside the through hole as going away from the lower surface of the partition portion.

15. The animal toilet according to claim 14,
wherein a lower end of the wall part is in the through hole in a plane view.

16. The animal toilet according to claim 14,
wherein an opening area of a lower end of the wall part is smaller than an opening area of an upper end of the wall part.

17. The animal toilet according to claim 16,
wherein an inner diameter of the wall part decreases gradually from the upper end toward the lower end.

18. An animal toilet comprising:
a partition portion that has a through hole allowing urine to pass therethrough;
an upper space in which a plurality of grains are disposed, the upper space being above the partition portion;
a lower space in which the urine having passed through the through hole accumulates, the lower space being below the partition portion; and
a box-shaped container that has a bottom face part and a side face part, wherein
the partition portion includes a wall part that is around the through hole on a lower surface of the partition portion, the wall part projecting toward the lower space,
the partition portion divides an internal space of the container into the upper space and the lower space, and
the partition portion is not fixed to the container.

19. The animal toilet according to claim 18,
wherein the container has an overhanging part that is provided so as to overhang from the side face part toward an inside of the container, and
the partition portion is placed on the overhanging part.

* * * * *